United States Patent [19]
Eckhardt

[11] 3,929,358
[45] Dec. 30, 1975

[54] CRYOGENIC CONNECTOR
[75] Inventor: Fred A. Eckhardt, Anaheim, Calif.
[73] Assignee: McDonnell Douglas Corporation, Long Beach, Calif.
[22] Filed: May 1, 1974
[21] Appl. No.: 466,011

[52] U.S. Cl. ................ 285/353; 285/349; 285/415
[51] Int. Cl.² ............................................ F16L 19/00
[58] Field of Search ...... 285/DIG. 5, 348, 349, 353, 285/354, 414, 415, 422, DIG. 18

[56] References Cited
UNITED STATES PATENTS

| | | | |
|---|---|---|---|
| 607,180 | 7/1898 | Landis | 285/354 X |
| 1,460,105 | 6/1923 | Malone | 285/354 X |
| 2,871,036 | 1/1959 | Goodman | 285/354 |
| 3,108,825 | 10/1963 | MacDonald, Jr. | 285/18 |
| 3,125,361 | 3/1964 | Weaver | 285/354 X |
| 3,285,631 | 11/1966 | Stolpmann | 285/354 |

FOREIGN PATENTS OR APPLICATIONS

| | | | |
|---|---|---|---|
| 820,113 | 9/1959 | United Kingdom | 285/354 |
| 795,459 | 1/1936 | France | 285/353 |

*Primary Examiner*—Andrew V. Kundrat
*Attorney, Agent, or Firm*—G. W. Finch; W. J. Jason; D. L. Royer

[57] ABSTRACT

A tubing or pipe connector assembly primarily for use at cryogenic temperatures. The connector is of the screw thimble, gland type which is provided with a sealing member having a malleable metal seal partially inset in an annular groove in its radial face or faces. The sealing force for the seal is provided by spring members which are compressed when the threaded gland is screwed into the thimble. Materials used in the connector system are selected to effectively maintain the seal as temperature and pressure are cycled. The thread system of the gland and thimble and the deflection of the spring member can be selected so that after the connector components have been assembled to a finger-tight condition, approximately a single turn of the gland finishes the connection operation.

9 Claims, 4 Drawing Figures

CRYOGENIC CONNECTOR

BACKGROUND OF THE INVENTION

The handling of materials at cryogenic temperatures is becoming more and more important, especially since what a short time ago were deemed exotic fuels such as liquid hydrogen, are now being seriously considered as substitutes for the petroleum fuels being used in the current generation of aircraft. This possible shift to liquid hydrogen has been brought about by world-wide shortages of petroleum fuel and environmental considerations. When fuels such as liquid hydrogen are being handled, it is important that none leaks as freeze burns and explosions can result, yet the lines used to transmit such materials must have connectors therealong for original installation, cleaning, repair and replacement.

The basic problem in cryogenic fluid transfer systems is to provide a simple, inexpensive, make/break joint which will reliably maintain leakage less than $1.3 \times 10^{-9}$ sccs (standard cubic centimeters per second) during thermal cycling from 2.5°K to 300°K. There are many manufacturers of connectors claiming at least partial success in this application. The connectors that are presently available can be divided into two categories; those which effect a seal with a Teflon or soft metal coated interface, such as that shown in STOLPMANN, U.S. Pat. No. 3,285,631, or MAC DONALD JR., U.S. Pat. No. 3,108,825, and those which utilize a crushable metal interface. However, of the known seal or connector designs, all have one or more disadvantageous features or problems. For example, due to difficult machining geometry and/or highly polished sealing surfaces, some connectors are costly. Others have a high make/break cost because they employ expensive machined seal rings which can be used only once or are difficult to assemble and disassemble. Some connectors employ sharp edges and polished sealing surfaces which tend to get damaged in handling and storage so that leakage paths are introduced. The seals and the attached plumbing of some connectors are also easily damaged by high fastening torque or initial misalignment of the mating part. Other connectors which appear to be satisfactory at first glance, leak because of relative changes in geometry and sealing force during variations in temperature and pressure. In addition, in most prior art cryogenic connectors, the sealing force is unpredictable because of the variable friction caused by unlubricated threaded fasteners therein, lubricant means normally being difficult or dangerous when liquid flammable gases are involved such as oxygen or hydrogen.

SUMMARY OF THE INVENTION

The present cryogenic tubing or pipe connector assembly includes a threaded gland and thimble connection pair which draws the connector together and establishes the desired sealing force. The seal itself is retained in a groove which may be integral to one of the mating connector surfaces or be included in a separate seal ring grooved on both sides and thereby removable for seal replacement in part or in whole. This latter embodiment facilitates seal make-up at a location remote from the connector and at an idealized orientation rather than at whatever orientation the cryogenic connector has been forced to assume. The latter embodiment also lends itself to the use of prefabricated seals.

The force across the seal is achieved by the selection of an appropriate number and combination of conical spring washers (Belleville springs) in series with the seal. When the gland and screw thimble of the connector are being tightened, the conical spring washers signal that the appropriate force has been reached by a rapid increase in the tightening torque. This increase is relatively independent of thread friction or other torque modifiers and so it is quite accurate and depends almost entirely upon the selection of the conical spring washers. Since the spring washers are used to supply the force for the seal, a thread system can be selected for the gland and screw thimble so that a repeatable and predictable geometry of the alignment of the mating gland and screw thimble may be utilized to signal visually whether the connector is in fact tight. Also, since the sealing force produced by the conical springs is essentially constant, independent of temperature, the conical springs can apply the desired sealing force even though the other components of the connector may expand or contract during cool-down or warm-up, to or from cryogenic temperatures.

When the connector is tight, the conical springs are flat, all deflection thereof being absorbed during the connector make-up. Therefore subsequent external loads to the fluid system pressure or plumbing distortions are transmitted through the connector with essentially no distortion or other disturbance to the seal.

The mating ends of the tubing in the connector about the seal are designed with a tube and socket geometry so that adequate alignment of the parts is required before the gland and screw thimble can be screwed together. This assures proper seal alignment and minimizes the chances of cross-threading. Also, since the seal is constructed from malleable metal and can be extruded by the sealing force, the tube portion effects a barrier to prevent migration of the seal metal into the fluid stream.

As shown the connector can be manufactured with liberal machining and fabrication tolerances for the quality of the seal attained. There is no requirement for sharp edges or super finished surfaces to affect the seal and therefore the attendant risk of damage during handling or storage is minimized. The present connector will consistently, without abnormal care in seal preparation, produce a joint which has leakage less than $1.3 \times 10^{-9}$ sccs of helium gas at a pressure of 100 psi and a temperature of −320°F. While this is not leak tight, it is leakage at a rate so low as to be negligible in all but critical applications. Tests of some connectors and useage in long term application have indicated much lower leakage levels can be attained with careful workmanship to take care of the critical applications. It is also possible to choose the components of the present connector so that differential shrinkage will occur, adding force across the sealing surface during cooling to cryogenic temperatures to oppose any mechanical stretch caused by pressure within the fluid system.

It is therefore an object of the present invention to provide an easily constructed and economical cryogenic connector.

Another object of the present invention is to provide a cryogenic connector which can be assembled with ordinary hand tools by means of relatively simple instructions to an untrained individual.

Another object is to provide a cryogenic connector which allows only negligible leakage.

Another object is to provide a connector which can be visually inspected for tightness.

Another object is to provide a cryogenic connector whose seal is reuseable and/or replaceable with prefabricated replacement seals.

Another object is to provide a cryogenic connector whose tightening means do not torque the seal during make-up, thereby eliminating a possible source of damage to the sealing surface or to the associated plumbing.

These and other objects and advantages of the present invention will become apparent after considering the following detailed specification which covers preferred embodiments thereof in conjunction with the accompanying drawings wherein:

DESCRIPTION OF THE PRESENT EMBODIMENT

Figure 1:
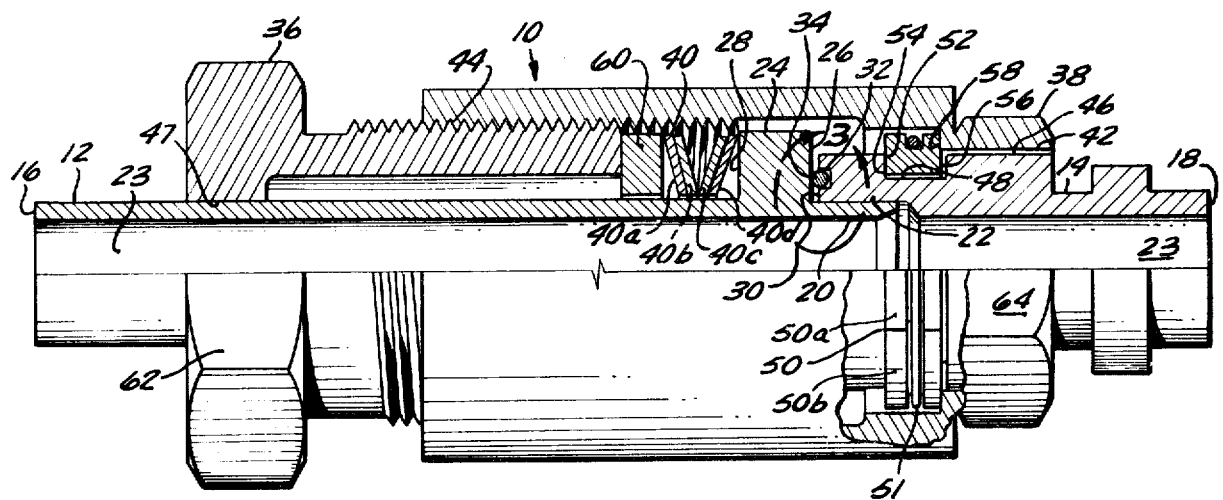
FIG. 1 is a partial, cross-sectional, elevational view of a cryogenic connector constructed according to the present invention.

Referring to the drawing more particularly by reference numbers, number 10 in FIG. 1 refers to a cryogenic connector constructed according to the present invention. The connector 10 includes male and female tubing extensions 12 and 14 which are adapted to be welded into a tubing system at their outermost ends 16 and 18. The tubing extension 12, which is the male portion of the connector 10, has an innermost end in the form of a sleeve 20 which fits into a socket 22 in the female tubing extension 14. The sleeve and socket arrangement assures the proper axial alignment of the two tubing extensions 12 and 14 when they are pushed together to form the cryogenic material passageway 23. It should be realized that in the following explanation, it is the existence of the sleeve and socket arrangement that is important and even though other components are related to specific extensions 12 or 14, their roles as male and female can be reversed.

A radial flange 24 having opposite abutment surfaces 26 and 28 is formed on the male tubing extension 12 adjacent to the sleeve 20. The abutment surface 26 is a sealing surface of the connector 10 while the abutment surface 28 is used to apply force across the seal. The seal itself is formed in a radial surface 30 on the innermost end of the tubing extension 14, the radial surface 30 being parallel to the abutment surface 26. A concentric, annular groove 32 is provided in the surface 30 to retain the connector seal 34 which will be discussed in detail hereinafter. The force necessary to establish and maintain a sealed condition between the seal 34, the groove 32 and the radial surface 30 is provided by means of a gland 36 which threadably engages a screw thimble 38 and spring means such as the Belleville springs 40 shown.

The screw thimble 38 is a sleeve whose end 42 thereof opposite from the threaded end 44, has the minimum internal diameter thereof. The minimum diameter of the end 42 is larger than the maximum diameter of the tubing extension 14 over which the screw thimble 38 fits and therefore the screw thimble 38 can be removed from the tubing extension 14 in either axial direction. The tubing extension 14 includes a flange 46 having an outermost diameter slightly less than the minimum diameter of the screw thimble 38 and the combination of diameters is used to maintain the relative alignment thereof. The gland 36 has a similar minimum diameter portion 47 which maintains the alignment of the gland 36 with the extension 12. Adjacent the flange 46, a radial groove 48 is provided to retain a split ring 50, shown as a two part split ring consisting of portions 50a and 50b. Suitable means such as the wire 51 can be employed to retain the split ring portions 50a and 50b into a single ring 50 so that the split ring 50 does not drop out of the radial groove 48 when the screw thimble 38 is removed therefrom. The split ring 50 has an innermost diameter small enough to engage the side 52 of the radial groove 48 with one face 54 thereof while the opposite face 56 of the split ring has a maximum diameter sufficient to extend above the flange 46 and engage a radial abutment surface 58 on the screw thimble 38. Therefore, the split ring 50 when in place prevents the screw thimble from slipping toward the gland 36 when the connector 10 is being assembled and it provides a load path from the screw thimble 38 to the tubing extension 14 and hence, the seal 34.

The gland 36 when screwed into the screw thimble 38 bears against a washer 60 which likewise bears against the springs 40 to compress them against the abutment surface 28 of the tubing extension 12. When the springs 40 are compressed to a flattened condition, the torque required for further compression rises markedly, indicating to the installer that a proper force across the seal 34 has been accomplished. This force is, of course, variable by properly choosing and installing different types of Belleville springs. In FIG. 1 the springs 40a and 40b are placed in parallel and in series with parallel springs 40c and 40d. The placing of the springs 40 in parallel doubles the force required for compression while the placing of the springs in series increases the distance that the gland 36 must be screwed into the screw thimble 38. Series positioning is used to match the connector 10 to its thread system. The size and configuration of the springs 40 also allows the installer to compensate for expected changes in connector length either due to internal pressure or temperature. Compensation can also be provided by component material selection. For example, brass shrinks more than stainless steel so if the screw thimble 38 is constructed from brass while the gland 36 and the extensions 12 and 14 are constructed from stainless steel, the connector 10 will tighten as its temperature is lowered to compensate for the internal pressure applied to the connector 10 by the cryogenic material being conducted therethrough.

It should be noted that the gland 36 and a screw thimble 38 include means such as the flats 62 and 64 shown for engagement with torquing tools such as wrenches. When assembling the connector 10, the flats 64 are used to fix the screw thimble 38 while the gland 36 is torqued by means of the flats 62. Since the Belleville springs, as installed, cannot transfer any more than an insignificant amount of torque, the torque is not transferred to the seal 34. Substantial torques on the seal 34 might cause it to wear against the surface 26, thus reducing the number of disassemblies it can withstand before replacement.

Figure 2:
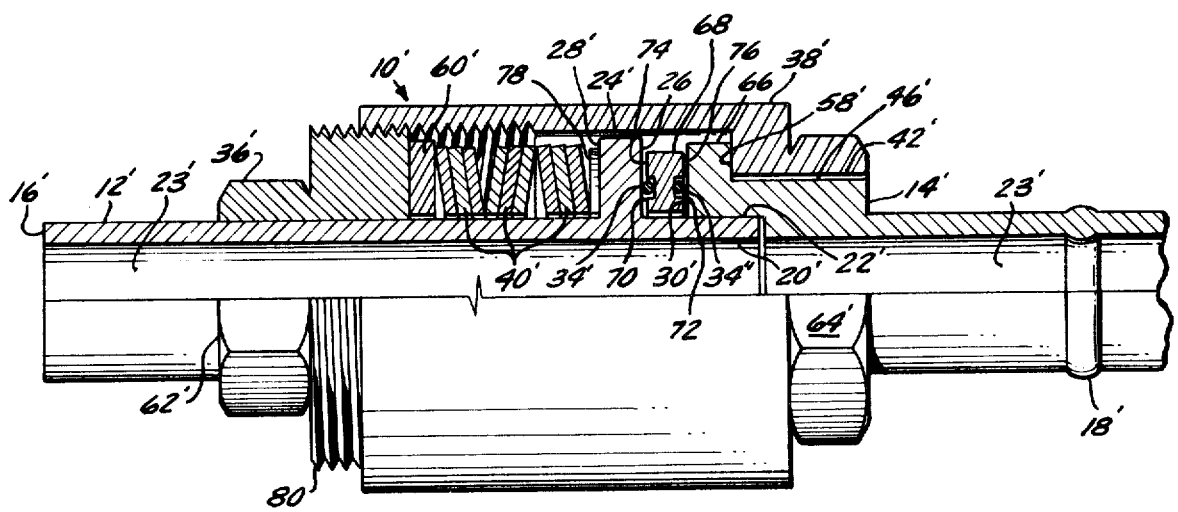
FIG. 2 is also an elevational view of a modified connector constructed according to the present invention, shown in partial cross-section.

FIG. 2 shows an alternate embodiment of the present connector. Its portions which are similar to those of connector 10 in FIG. 1 are shown with the same number with a prime (') added thereto. The connector 10' has no radial groove 48 to engage a split ring 50 but instead employs a radial flange 66 which abuts the abutment surface 58' of the screw thimble 38' to provide the force transference path between the screw thimble 38' and the tubing extension 14'. Of course if it is desired to have a removable screw thimble 38, the split ring or other suitable arrangement can be provided. The radial surface 30' and the abutment surface 26' provide the two opposing surfaces between which a separate ring-shaped sealing member 68 is positioned. The sealing member 68 includes concentric grooves 70 and 72 in its opposite side surfaces 74 and 76 for retaining seals 34' and 34''. The seals 34' and 34'' are placed in the grooves to form the actual sealing means and they are similar to the seal 34 shown in FIG. 1. The separate ring-shaped sealing means 68 is removable from the connector 10' when it is disassembled so that the sealing members 68 can be prefabricated at a remote assembly point and then be installed in connectors 10' as they are needed. This differs from the seal 34 in connector 10 which is actually positioned in the end radial surface 30 of the tubing extension 14 and therefore, it cannot be prefabricated in the groove 32 more than once.

As can be seen in FIG. 2, the seal force applying springs 40' are shown in three series sets of three parallel springs. The additional set of springs is used to increase the distance that the gland 36' must screw into the screw thimble 38' to move from a finger-tight condition to a full force producing engaged position. That each set has three springs shows that any number of springs 40' can be placed in parallel to provide the desired sealing force. As shown, an additional washer 78 adjacent the springs 40' can be used if there is a chance that the springs 40' might dig into the radial flange 24'.

As shown, the thread system 80 in connector 10' has a selected thread system matched to the number of sets of series springs 40' so that the gland 36 requires only approximately one complete revolution to go from fingertight to fully engaged position. The thread system 80 since it is shielded from the conducted cryogenic materials by the seals 34' and 34'', can be lubricated with dry lubricants such as those sold by the Microseal Corporation of Mountain View, California to improve the tightening torque feel if such is required.

Figure 3:
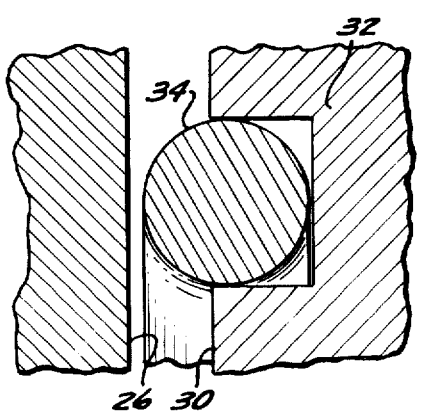
FIG. 3 is an enlarged, cross-sectional view of portion 3—3 of FIG. 1 before sealing force has been applied across the seal.
Figure 4:
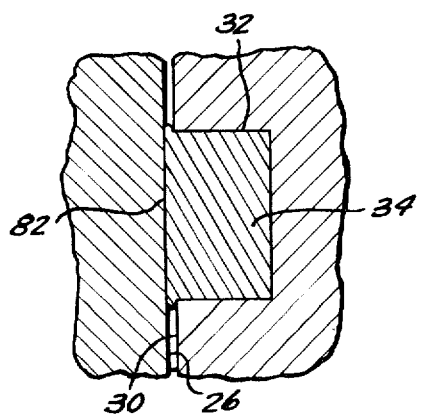
FIG. 4 is an enlarged, cross-sectional view similar to FIG. 3 after sealing force has been applied across the seal.

FIGS. 3 and 4, respectively, show a seal 34, 34' or 34'', after it has been installed in a seal groove such as groove 32 and after it has been compressed. Although the seal 34 is shown as a circular seal before compression, it can be molded into a groove fitting shape initially. It has been found, however, that sealing materials such as indium, bismuth and lead alloy or indium and tin alloy as well as other malleable metal materials normally come in wire form which makes it convenient to design the groove to fit available wire diameters. The wire is usually cut to a specified straight length which is then bent to form the circular seal 34.

As can be seen when comparing FIGS. 3 and 4, the volume of the seal 34 is chosen so that it is slightly greater than the volume of the groove 32. This means that when the surfaces 30 and 26 are forced toward each other by the springs 40, the seal 34 prevents the two surfaces from touching and a small amount of seal material extrudes into the gap therebetween. This small extra amount provides assurance that sufficient seal material is available to fill any discontinuites which might result in the seal surface 82 due to disassembly or minor careless damage thereto.

Therefore there has been shown and described novel cryogenic connectors which fulfill all of the objects and advantages sought therefor. Any changes, modifications, variations and other uses and applications of the subject cryogenic containers will, however, become apparent to those skilled in the art after considering this specification and the accompanying drawing. All such changes, modifications, alterations and other uses and applications which do not depart from the spirit and scope of the invention are deemed to be covered by the invention which is limited only by the claims which follow.

What is claimed is:

1. A connector for fluid lines containing cryogenic materials, the connector including:
   a first tubing extension defining a passageway therethrough for containing the cryogenic material, said first tubing extension including an outwardly extending radial sealing surface and an abutment surface;
   a second tubing extension defining a passageway therethrough for containing the cryogenic material, said second tubing extension including an outwardly extending radial sealing surface positioned to face said outwardly extending radial sealing surface of said first tubing extension and an abutment surface;
   seal means positioned between said outwardly extending radial sealing surfaces of said first and second tubing extensions and about said defined cryogenic material containing passageway; and
   means to apply a predetermined force across said first and second tubing extension members to compress said seal means therebetween to establish and maintain a sealed condition thereof said force applying means including a gland extending over a portion of one of said tubing extensions, a thimble extending over a portion of the other of said tubing extensions, abutting said abutment surface thereof and threadably engaging said gland, and spring means positioned about said tubing extension over the portion of which said gland extends and engaging said abutment surface thereof, said spring means also engaging said gland and being compressed when said gland and thimble are threadably engaged.

2. The connector defined in claim 1 wherein said seal means include:
   a concentric groove in the outwardly extending radial sealing surface of one of said tubing extensions: and
   a seal positioned in said concentric groove constructed at least in part from material in a group consisting of lead, tin, indium and bismuth.

3. The connector defined in claim 2 wherein said thimble abutting tubing extension includes:
   a radial groove formed thereabout; and a split ring which engages said radial groove, said split ring extending outwardly from said radial groove to form said thimble abutting tubing extension's abutment surface.

4. The connector defined in claim 1 wherein said spring means include at least one Belleville washer and said thimble is constructed from a material which when subjected to cryogenic temperatures, shrinks more than the material from which said first and second tubing extensions are constructed.

5. The connector defined in claim 1 wherein the spring means have a predetermined maximum deflection, said thimble and gland having a thread system which compresses said spring means from an essentially unstressed condition to said predetermined maximum deflection when one is rotated about one turn with respect to the other.

6. The connector defined in claim 1 wherein said seal means include a seal ring having:
 a first radial face facing said first outwardly extending radial sealing surface of said first tubing extension;
 a second radial face facing said second outwardly extending radial sealing surface of said second tubing extension;
 a first concentric groove in said first seal ring radial face;
 a second concentric groove in said second seal ring radial face;
 a first seal positioned in said first concentric groove; and
 a second seal positioned in said second concentric groove.

7. The connector defined in claim 6 wherein the volume of said first concentric groove is slightly less than the volume of said first seal and the volume of said second concentric groove is slightly less than the volume of said second seal.

8. The connector defined in claim 6 wherein said seals are constructed at least in part from a group of materials consisting of lead, tin, indium and bismuth.

9. The connector defined in claim 8 wherein said seals are homogeneous.

* * * * *